(No Model.)
G. W. ALDRICH.
FAUCET FASTENER.
No. 431,791. Patented July 8, 1890.
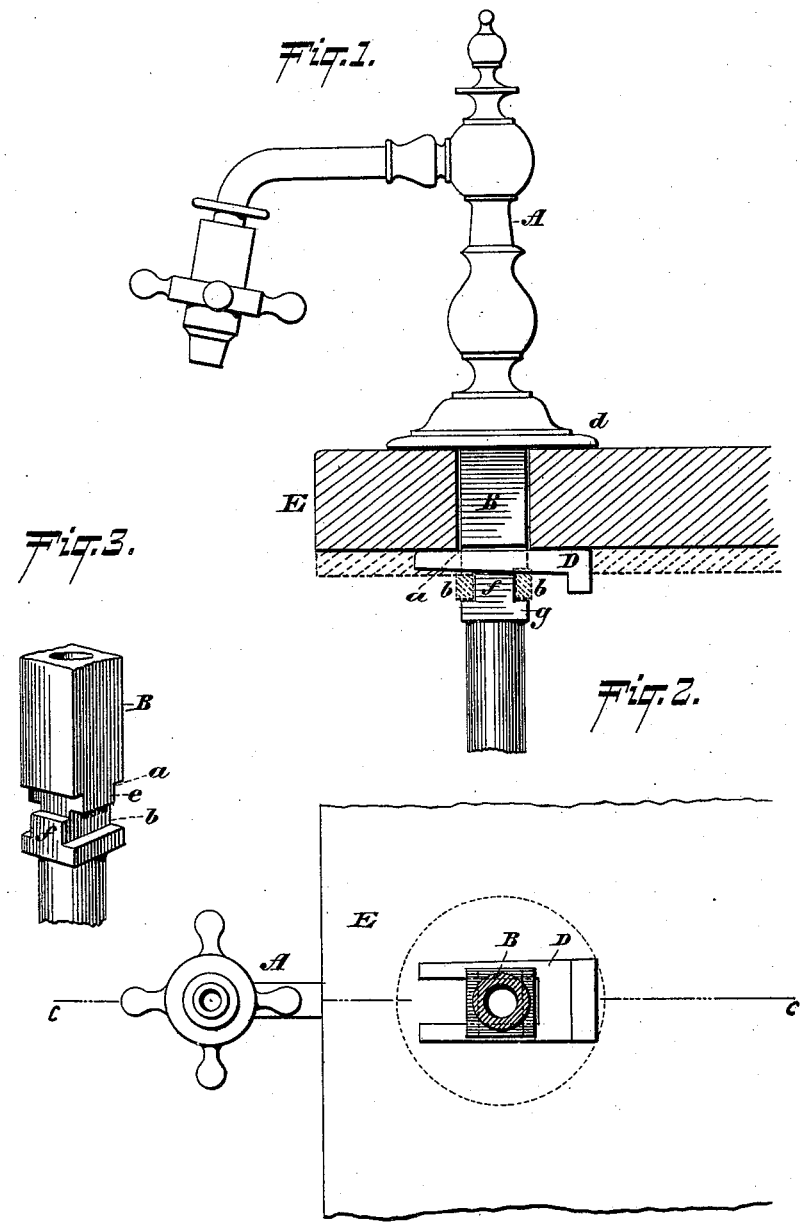
WITNESSES:
Gustave Dieterich
William Goebel
INVENTOR
George W. Aldrich
BY Briesen & Knauth
ATTORNEYS.

UNITED STATES PATENT OFFICE.

GEORGE W. ALDRICH, OF BROOKLYN, NEW YORK, ASSIGNOR OF ONE-HALF TO WILLIAM GREEN, OF SAME PLACE.

FAUCET-FASTENER.

SPECIFICATION forming part of Letters Patent No. 431,791, dated July 8, 1890.

Application filed April 25, 1890. Serial No. 349,462. (No model.)

*To all whom it may concern:*

Be it known that I, GEORGE W. ALDRICH, a resident of Brooklyn, Kings county, and State of New York, have invented an Improved Faucet-Fastener, of which the following is a specification, reference being had to the accompanying drawings, forming part thereof, wherein—

Figure 1 is a side view of my improved faucet-fastener. Fig. 2 is a bottom view of the same, and Fig. 3 a perspective view of part of the same.

This invention has for its object so to construct the shank of the faucet that it can be rapidly and conveniently attached to and securely held on a perforated slab or table of suitable thickness. Faucets of this character are usually attached to marble slabs, and these slabs are furnished, as a rule, in thicknesses varying about one-quarter of an inch from one another, the thinnest slabs being usually one and one-quarter inch thick, the next one and one-half inch, the next one and three-quarters, &c. Heretofore the shanks of such faucets were usually secured by means of screw-nuts applied to them beneath the slab, so as to bear against the lower surfaces thereof; but it is difficult to apply the proper wrenches or tools for manipulating the nuts on the under side of a basin-slab, and, moreover, after the faucet has been in use for a certain length of time the screw-threads are liable to become rusty, rendering the fastening insecure in many instances and making it particularly difficult to move the nut up or down when this is needed for the purposes of repair, &c. By my invention I seek to obviate these difficulties and to substitute for the screw-nut a forked wedge or key which straddles the shank, the said shank being grooved in varying directions, as hereinafter specified, to admit of the application of the key beneath slabs of different thicknesses.

In the drawings, the letter A represents the body of a faucet of suitable construction, B being its shank, which is that part of the faucet beneath the flange *d* which rests on the slab E. Beneath this slab E the shank B is grooved with differents sets of grooves *a b*, &c.—that is to say, the grooves *a*, as is more clearly seen in Fig. 3, are parallel with each other on opposite sides of the shank. The grooves *b*, however, are at right angles to the grooves *a* and on a plane below the same, so that the body of the shank at *e*, which is between the grooves *a*, will be above the grooves *b*, and in like manner the substance of the metal *f* which is between the grooves *b* will be below the grooves *a*. Thus I provide by this arrangement of grooves a bearing for the key D, which I employ. This key D is a forked wedge-like piece of metal, which is placed in the proper groove directly beneath the slab E, so that it shall bear with its upper face against the under side of the slab, while its lower face bears against the metal of the shank—in Fig. 1 against the metal *f* left between the grooves *b*, the grooves *b* in this instance not being utilized; but if a slab thicker than the one shown by full lines in Fig. 1 be employed—such as the slab indicated by dotted lines in the same figure—then the key D will be placed in the grooves *b* so as to bear against the under side of this thicker slab, the lower side of the key resting on the solid metal *g*, which is left beneath the grooves *b*. Two sets of grooves are shown in the drawings; but of course their number may be increased at will, the point of importance being that each set of grooves shall be at a right or other proper angle to the set of grooves next above and to that next below the same. By a gentle tap with a hammer this key D can be conveniently disengaged from its position on the faucet and slab, and the faucet thus released, and in like manner a gentle tap of the hammer will again refasten said key, so that without inconvenience the faucet can be secured in place and detached, and no difficulty will be experienced from corrosion or otherwise as to the security of this fastener.

What I claim, and desire to secure by Letters Patent, is—

The faucet A, having the flange *d*, and having the shank B beneath said flange provided with series of grooves *a b*, running at varying angles to one another, substantially as herein specified, in combination with the forked key, all as described.

GEORGE W. ALDRICH.

Witnesses:
HARRY M. TURK,
LIVINGSTON EMERY.